United States Patent [19]

Kubota et al.

[11] Patent Number: 4,629,501

[45] Date of Patent: Dec. 16, 1986

[54] METHOD FOR MANUFACTURE OF ANTIMONY OF HIGH PURITY

[75] Inventors: Mitsugi Kubota; Hiroshi Kakemizu, both of Niihama, Japan

[73] Assignee: Sumitomo Metal Mining Company Limited, Tokyo, Japan

[21] Appl. No.: 792,252

[22] Filed: Oct. 28, 1985

[30] Foreign Application Priority Data

Oct. 31, 1984 [JP] Japan .................................. 59-229594

[51] Int. Cl.$^4$ ............................................ C22B 30/02
[52] U.S. Cl. ........................................................ 75/69
[58] Field of Search ............................................ 75/69

[56] References Cited

U.S. PATENT DOCUMENTS 3,201,101 10/1985 Jacques .................................... 75/69

Primary Examiner—Melvyn J. Andrews
Attorney, Agent, or Firm—Watson, Cole, Grindle & Watson

[57] ABSTRACT

Antimony of high purity is produced from a crude antimony compound by a method which comprises the steps of preparing an aqueous antimony chloride solution using the crude antimony compound, distilling the aqueous antimony chloride solution at a temperature in the range of 200° to 230° C. to recover distilled antimony chloride and injecting the distilled antimony chloride into a current of hydrogen at a temperature exceeding 800° C.

7 Claims, No Drawings

METHOD FOR MANUFACTURE OF ANTIMONY OF HIGH PURITY

BACKGROUND OF THE INVENTION

1. Field of the Invention

This invention relates to a method for the manufacture of antimony of the grade of the order of 99.99% by weight.

2. Description of the Prior Art

Antimony has found extensive utility as the hard lead in batteries, and in recent years, it has been increasingly used in electronic materials.

For example, it is used in Sn-Sb alloy solder for sealing ceramic packages on LSI's, in Hall devices, and in In Sb for infrared ray detectors. These electronic materials are required to possess high enough reliability that they will meet the trend of LSI's toward increased integration and decreased size. Consequently, antimony used in electronic materials must have a high purity.

Various methods for producing antimony of high purity are known. These include the electrolysis method, the metal distillation method, the oxide reduction method, and the zone refining method. Among these methods, the electrolysis method has found widespread recognition. By this particular method, antimony is produced in large quantities and marketed.

However, the electrolysis method, is not especially effective in separating out such impurities as arsenic and bismuth and it necessitates additional use of the zone refining method. In addition, the procedure involved is complicated and the cost of operation is high.

SUMMARY OF THE INVENTION

An object of this invention is to provide a method for the manufacture of antimony of high purity (of the order of 99.999% by weight) by a simple procedure which avoids the drawbacks mentioned above.

The other objects and characteristic features of this invention will become apparent to those skilled in the art as the disclosure is made in the following description.

The inventors have conducted a diligent study in search of a reliable method capable of producing antimony of high purity at low cost. They have found that when an aqueous solution of antimony chloride is distilled, water, hydrochloric acid, and then such low boiling point components as arsenic, are distilled during the initial stage of distillation, that the temperature of the reaction system sharply rises and antimony chloride distillates when the distillation of the aforementioned low boiling point components is completed, and that such high boiling point components as lead and bismuth remain substantially quantitatively until the distillation of antimony chloride is substantially completed. They have further found that when the antimony chloride obtained by this fractional distillation is dissolved in water and the resultant aqueous solution is reduced in a current of hydrogen, antimony of the desired grade can be obtained with high efficiency. The present invention has been produced on the basis of this discovery.

DETAILED DESCRIPTION OF THE INVENTION

To be specific, this invention concerns a method for the manufacture of antimony of high purity, which comprises thermally distilling, in a conventional distillation device, an aqueous antimony chloride obtained by dissolving commercially available antimony oxide in hydrochloric acid, for example thereby initially distilling water, hydrochloric acid, and low boiling point components at temperatures of 100° to 110° C. and, after the temperature abruptly rises and reaches the neighborhood of 200° C., switching the reaction vessel to a receptacle containing a small amount of pure water and admitting the distillates therein, and, after the distillation proceeds until complete disappearance of the solution and the temperature rises and passes 230° C., terminating the distillation, then converting the aforementioned distillate ($SbCl_3$) into a form resembling an aqueous solution when necessary by addition of a small amount of pure water, and injecting the resultant liquid into a current of hydrogen at a temperature exceeding 800° C., and preferably approximating about 900° C., thereby reducing the aforementioned antimony chloride.

In the method of the present invention, the temperature of the distillation is defined to fall in the range of 200° to 230° C. because low-temperature distillates mingle into the distilled antimony at temperatures of less than 200° C. and high-temperature distillates mingle into the distilled antimony at temperatures exceeding 230° C., respectively, to impair the purity of produced antimony.

The antimony chloride obtained by the distillation is injected into a reducing container kept at a temperature exceeding 800° C., and preferably reaching 900° C., and brought into contact with the current of hydrogen so as to be reduced thereby. The antimony chloride, prior to the injection, is desired to be prepared in the form of aqueous solution by addition of about 10% by weight of water. This preparation is desirable because antimony chloride has a melting point of about 73° C. and has the possibility of clogging a guide pipe used for its transfer. The preparation may be omitted on condition that the guide pipe is constructed so as to be kept at a temperature exceeding the melting point of antimony chloride.

The antimony chloride so injected into the reducing container is vaporized by the heat and consequently allowed to react with hydrogen in the gaseous phase and reduced to metallic antimony. The temperature of this heating is defined to be at least 800° C. because the reaction velocity is so low as to impair the efficiency of the apparatus at temperatures of less than 800° C. As concerns the relation between the amount of antimony chloride to be injected and the amount of the current of hydrogen, the amount of hydrogen is required to be an an excess, preferably to be 1.1 to 2.5 times, and more preferably to be 1.1 to 1.5 times, the stoichiometric equivalent weight relative to the amount of antimony chloride. The metallic antimony produced by the reduction adheres to and flows down the inner wall surface of the reducing container and collects in the form of melt in the bottom of the container. The metallic antimony so deposited can be easily solidified by cooling, and then peeled and recovered from the container. When the apparatus is designed so as to permit continuous or intermittent removal of the aforementioned molten metallic antimony from the reducing container, the reduction can be carried out continuously.

Since this invention aims to produce antimony of high purity and requires the fullest possible attention to be paid to devices and reagents to be used, the pure water to be used in the final stage is desired to have a specific resistance of not less than 5MΩ·cm (at 25° C.)

and the firing tube for reduction is desired to be made of quartz or high alumina.

In accordance with the method of this invention, antimony of the high purity aimed at can be produced in an overall yield of not less than 65% when crude antimony oxide is used as the starting material.

The present invention will now be described more specifically below with reference to a working example.

EXAMPLE

In 2.5 liters of concentrated hydrochloric acid, reagent class 1, (35% by weight), 1 kg of crude antimony oxide of the analyses of Table 1 was dissolved by stirring at room temperature and filtrated. The ratios of extraction of the components were found by determining the contents of the relevant components in the insoluble residue.

The results are shown in Table 2.

TABLE 1

| $Sb_2O_3$ | Pb | As | Si | S (% by weight) |
|---|---|---|---|---|
| 99.80 | 0.10 | 0.01 | 0.005 | 0.03 |

TABLE 2

| | | Sb | Pb | As | Si | S | |
|---|---|---|---|---|---|---|---|
| (1) Extract (3.0 liters) | Ratio of extraction (%) | 97.99 | 9.0 | 99.0 | 60.0 | 10.0 | |
| | Content (g/liter) | 272.3 | 0.03 | 0.033 | 0.01 | 0.01 | |
| (2) Insoluble residue (25 g) | | 67.12 | 3.64 | <0.001 | 0.08 | 1.08 | (% by weight) |

It is noted from Table 2 that while antimony was extracted in a proportion of 98%, such impurities as arsenic and silicon were dissolved in relatively high proportions.

Then, the extract of Table 2 was wholly (3 liters) placed in a distillation flask having an inner volume of 5 liters and provided with a condenser and subjected to distillation, with the temperature adjusted with a 700-watt mantle heater.

After two hours and five minutes' standing of the gaseous phase at temperatures of 105° to 110° C. subsequently to the start of distillation, the temperature rose abruptly and reached 200° C. At this time, the container so far used for receiving the distillate was switched to a container holding 50 ml of cold water and the distillation was continued after the liquid portion disappeared at 200° to 215° C. until the temperature again began to rise, to effect separation of antimony chloride by distillation.

When the gaseous-phase temperature began to rise from 230° C., the mantle heater was turned off and the distillate was taken out. The main components of the first distillate and the final residue were assayed.

The results are shown in Table 3.

It is noted from Table 3 that the treatment produced an aqueous hydrochloric acid solution containing As wholly and Sb partly as low-temperature distillates. The intermediate distillate used in this invention was antimony chloride containing impurities in small proportions, representing a direct yield of about 80%.

Then, 1150 g of the $SbCl_3$ of Table 3 was weighted out and converted into an aqueous solution by addition of 115 ml of pure water (specific resistance 5MΩ·cm (at 25° C.)). In a clear quartz tube set in place in a halved horizontal circular electric oven kept at 900° C., the air was forced out with $N_2$ gas and the $N_2$ gas was displaced with hydrogen gas which was fed at a flow volume of 350 ml/minute. With a roller pump, the aforementioned aqueous solution was injected at a rate of 1 ml/minute into the aforementioned quartz tube. After the treatment mentioned above was completed, the power source connection to the oven was cut off and the oven was air cooled with one half thereof opened. The injected aqueous antimony chloride solution was reduced into metallic antimony and precipitated in the form of shorts or ingots in the central portion through the portion near the exit of the quartz tube. The metallic antimony could be easily peeled off the tube after cooling.

The analyses of the metallic antimony are shown in Table 4.

TABLE 4

| | Na | A | Si | S | K | Ca | Fe (ppm) |
|---|---|---|---|---|---|---|---|
| 522.7 g | 1.0 | 0.2 | 3.0 | 2.0 | 0.2 | 0.2 | 0.3 |

It is noted from Table 4 that the total content of impurities was about 7 ppm and antimony of high purity was obtaned in a direct yield of 85.0%.

In accordance with this invention, antimony of high purity can be produced efficiently by a relatively simple procedure.

Thus, virtually all antimony compounds can be used as the starting material for the production of antimony of high purity by this invention.

Even when a given starting material contains impurities in large amounts, the production of antimony of high purity can be attained by repeating the initial distillation.

What is claimed is:

1. A method of manufacturing high purity antimony which comprises the steps of
   (a) preparing a first aqueous solution of antimony chloride, containing low-boiling components
   (b) heating said first aqueous solution of antimony chloride to less than 200° C. to remove low-boiling components therefrom,
   (c) further heating said first aqueous solution of antimony chloride to between 200° C. and 230° C. to distill antimony chloride therefrom,
   (d) recovering the antimony chloride distilled from said first aqueous solution in step (c),

TABLE 3

| | Sb | Pb | As | Si | S | Balance |
|---|---|---|---|---|---|---|
| Low-temperature distillate 2.5 l | 69.96 g/l | | 0.036 g/l | | | HCl etc. |
| $SbCl_3$ 1.2 kg | 53.50% by weight | <5 ppm | <1 ppm | 5 ppm | 10 ppm | Cl etc. |
| Residue 1.0 kg | | 9.0% by weight | | 3.0% by weight | 3.0% by weight | |

(e) adding pure water to the antimony chloride recovered in step (d) to provide a second aqueous solution of antimony chloride, said water being added in an amount of 10% by weight of said recovered antimony chloride, (f) passing said second aqueous solution of antimony chloride into a reducing container, (g) passing a stream of hydrogen through said reducing container at a temperature exceeding 800° C. so that the antimony chloride in said second aqueous solution of antimony chloride injected therein will react with said hydrogen to produce high purity antimony, and (h) recovering said high purity antimony.

2. A method according to claim 1, wherein said first aqueous solution of antimony chloride is produced by dissolving crude antimony oxide in hydrochloric acid.

3. A method according to claim 1, wherein said pure water possesses a specific resistance exceeding 5MΩ·cm (at 25° C.).

4. A method according to claim 1, wherein said reducing container is made of quartz or high alumina.

5. A method according to claim 1, wherein said stream of hydrogen is used in an amount 1.1 to 2.5 times the stoichiometric equivalent weight thereof based on the amount of antimony chloride injected therein.

6. A method according to claim 5, wherein said stream of hydrogen is used in an amount 1.1 to 1.5 times the stoichiometric equivalent weight thereof.

7. A method according to claim 1, wherein in step (g) said stream of hydrogen has a temperature of about 900° C.

* * * * *